(12) United States Patent
Boyle

(10) Patent No.: US 12,277,850 B1
(45) Date of Patent: Apr. 15, 2025

(54) AUTOMATIC FOREIGN OBJECT DEBRIS INSPECTION SYSTEM

(71) Applicant: Essential Aero, Inc., Rocklin, CA (US)

(72) Inventor: Stephen S. Boyle, Sacramento, CA (US)

(73) Assignee: Essential Aero, Inc., Rocklin, CA (US)

( * ) Notice: Subject to any disclaimer, the term of this patent is extended or adjusted under 35 U.S.C. 154(b) by 362 days.

(21) Appl. No.: 17/837,662

(22) Filed: Jun. 10, 2022

Related U.S. Application Data

(60) Provisional application No. 63/209,791, filed on Jun. 11, 2021.

(51) Int. Cl.

| G08B 21/18 | (2006.01) |
|---|---|
| B64C 39/02 | (2023.01) |
| G06F 18/24 | (2023.01) |
| G06T 7/00 | (2017.01) |
| B64U 101/30 | (2023.01) |
| H04N 7/18 | (2006.01) |

(52) U.S. Cl.
CPC .......... *G08B 21/182* (2013.01); *B64C 39/024* (2013.01); *G06F 18/24* (2023.01); *G06T 7/97* (2017.01); *B64U 2101/30* (2023.01); *G06T 2207/10032* (2013.01); *H04N 7/185* (2013.01)

(58) Field of Classification Search
None
See application file for complete search history.

(56) References Cited

U.S. PATENT DOCUMENTS

| 9,728,089 | B2 | 8/2017 | Marcus |
| 9,767,699 | B1 | 9/2017 | Borghese et al. |
| 9,875,657 | B2 | 1/2018 | Collins |
| 10,559,097 | B2 | 2/2020 | Ingrassia et al. |
| 10,665,110 | B2 | 5/2020 | Collins |
| 10,690,772 | B2 | 6/2020 | Van Voorst |
| 10,741,088 | B1 | 8/2020 | Walker et al. |
| 2006/0007035 | A1 | 1/2006 | Corrigan |
| 2019/0088025 | A1 | 3/2019 | Tamanaha et al. |
| 2019/0258859 | A1 | 8/2019 | Baynes et al. |
| 2020/0097721 | A1* | 3/2020 | Yakimenko .......... G05D 1/0094 |
| 2020/0174503 | A1 | 6/2020 | Cheikh et al. |
| 2020/0180791 | A1* | 6/2020 | Kimberly ............... B64D 45/00 |
| 2020/0207474 | A1* | 7/2020 | Foggia ................. G05D 1/0676 |

(Continued)

FOREIGN PATENT DOCUMENTS

| CN | 105222807 A | * 1/2016 | ............. G01C 25/00 |
| CN | 106813900 A | * 6/2017 | ............ G01M 11/00 |

(Continued)

OTHER PUBLICATIONS

English Translation for CN-115393738-A (Year: 2022).*

(Continued)

*Primary Examiner* — Jason Holloway

(74) *Attorney, Agent, or Firm* — Clause Eight; Michael Catania

(57) ABSTRACT

A method and system for detecting foreign object debris (FOD) from an UAV is disclosed herein. The UAV comprises avionics, an airframe, a location sensor, an attitude sensor, an intelligent payload comprising an edge processor capable of executing a machine learning model, at least one gimballed camera sensor, a data connection to the UAV avionics, and a data connection to a ground based data center.

6 Claims, 20 Drawing Sheets

(56) References Cited

U.S. PATENT DOCUMENTS

| | | | |
|---|---|---|---|
| 2020/0279367 A1 | 9/2020 | White | |
| 2020/0284557 A1* | 9/2020 | Madhav | H04N 7/188 |
| 2020/0301445 A1* | 9/2020 | Jourdan | G06K 19/06037 |
| 2020/0364843 A1* | 11/2020 | Stueve | G06V 10/764 |
| 2025/0014161 A1* | 1/2025 | Rakha | G06V 20/176 |

FOREIGN PATENT DOCUMENTS

| | | | | |
|---|---|---|---|---|
| CN | 107272028 A | * | 10/2017 | G01S 19/23 |
| CN | 109827754 A | * | 5/2019 | |
| CN | 111027475 A | * | 4/2020 | |
| CN | 115393738 A | * | 11/2022 | |

OTHER PUBLICATIONS

English Translation for CN-111027475-A (Year: 2020).*
English Translation for CN-109827754-A (Year: 2019).*
English Translation for CN-107272028-A (Year: 2017).*
English Translation for CN-106813900-A (Year: 2017).*
English Translation for CN-105222807-A (Year: 2016).*

\* cited by examiner

AUTOMATIC FOREIGN OBJECT DEBRIS INSPECTION SYSTEM

CROSS REFERENCE TO RELATED APPLICATION

The Present Application claims priority to U.S. Provisional Patent Application No. 63/209,791, filed on Jun. 11, 2021, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to unmanned aerial vehicles and other machines for foreign object debris detection.

Description of the Related Art

Unmanned aerial vehicles (UAV) and robotic devices have been used to perform a variety of complex tasks. For example, consumer-oriented drones allow operators to wirelessly control and fly a small unmanned aerial vehicle via a smartphone or a tablet. These consumer-oriented drones often include onboard systems that receive wireless signals from the user and perform semi-autonomous tasks, such as taking pictures, flying a pre-programmed pattern, and/or landing. In another example, some drones are capable of flying precise flight patterns, identifying and avoiding obstacles in a flight path, picking up objects, and taking off or landing at a desired location. Some robotic devices are suited to perform basic, tedious, and/or time-consuming tasks

BRIEF SUMMARY OF THE INVENTION

One aspect of the present invention is a method for detecting foreign object debris (FOD). The method includes flying an unmanned aerial vehicle (UAV) on a specific flight path near a movement area surface at a specific speed and altitude, the UAV comprising avionics, an airframe, a location sensor, an attitude sensor, an intelligent payload comprising an edge processor capable of executing a machine learning model, at least one gimballed camera sensor, a data connection to the UAV avionics, and a data connection to a ground based data center. The method also includes executing a computer vision application which positions the camera sensors at specific angles and collects a plurality of images at a plurality of specific locations. The method also includes comparing, at the computer vision application, a plurality of baseline images with the plurality of collected images to detect a plurality of anomalies. The method also includes tagging each of the plurality of anomalies with metadata. The method also includes transferring the plurality of tagged anomalies to a convolutional neural network for evaluation and classification. The method also includes transmitting over the data connection anomalies exceeding a predetermined threshold of duplicate detections in the same geographic location on overlapping images to a cloud service. The method also includes sending a notification comprising the plurality of evaluated anomalies exceeding a predetermined threshold to an inspection application. The method also includes generating an alert at the inspection application.

Another aspect of the present invention is a system for detecting foreign object debris (FOD). The system comprises a UAV, a computer vision application, an inspection application and a server. The UAV comprises avionics, an airframe, a location sensor, an attitude sensor, an intelligent payload comprising an edge processor capable of executing a machine learning model, at least one gimballed camera sensor, a data connection to the UAV avionics, and a data connection to a ground based data center. The UAV is configured to fly on a specific flight path near a movement area surface at a specific speed and altitude. The computer vision application is configured to execute to position the camera sensors at specific angles and collect a plurality of images at a plurality of specific locations. The computer vision application is configured to compare a plurality of baseline images with the plurality of collected images to detect a plurality of anomalies. The computer vision application is configured to tag each of the plurality of anomalies with metadata. The computer vision application is configured to transfer the plurality of tagged anomalies to a convolutional neural network of the server for evaluation and classification. The data connection is configured to transmit the anomalies exceeding a predetermined threshold of duplicate detections in the same geographic location on overlapping images to a cloud service. The cloud service is configured to send a notification comprising the anomalies exceeding the predetermined threshold to an inspection application. The inspection application is configured to generate an alert.

Yet another aspect of the present invention is a system for detecting foreign object debris (FOD) using a detection machine. The system comprises a detection machine, a computer vision application, an inspection application and a server. The detection machine comprises a location sensor, an intelligent payload comprising an edge processor capable of executing a machine learning model, at least one camera sensor, and a data connection to a ground based data center. The detection machine is selected from the group consisting of an unmanned aerial vehicle (UAV), a terrestrial robot and a fixed position articulating camera system. The detection device is configured to monitor a movement area surface. The computer vision application is configured to execute to position the camera sensors at specific angles and collect a plurality of images at a plurality of specific locations. The computer vision application is configured to compare a plurality of baseline images with the plurality of collected images to detect a plurality of anomalies. The computer vision application is configured to tag each of the plurality of anomalies with metadata. The computer vision application is configured to transfer the plurality of tagged anomalies to a convolutional neural network of the server for evaluation and classification. The data connection is configured to transmit the anomalies exceeding a predetermined threshold of duplicate detections in the same geographic location on overlapping images to a cloud service. The cloud service is configured to send a notification comprising the anomalies exceeding the predetermined threshold to an inspection application. The inspection application is configured to generate an alert.

The UAV preferably further comprises at least one of an EMI sensor, a PIM sensor, an audio sensor or a HIRF sensor. The UAV preferably further comprises a memory, a comparator, and an image capturing device.

The image capturing device is preferably a charge-coupled device (CCD) image sensor and a complementary metal oxide semiconductor (CMOS) image sensor. The images are preferably geocoded.

The method further includes configuring operational zones and surveying boundaries.

The terrestrial robot is configured to travel on a specific path over a movement area surface, or adjacent to a movement area surface, at a specific speed.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 18:
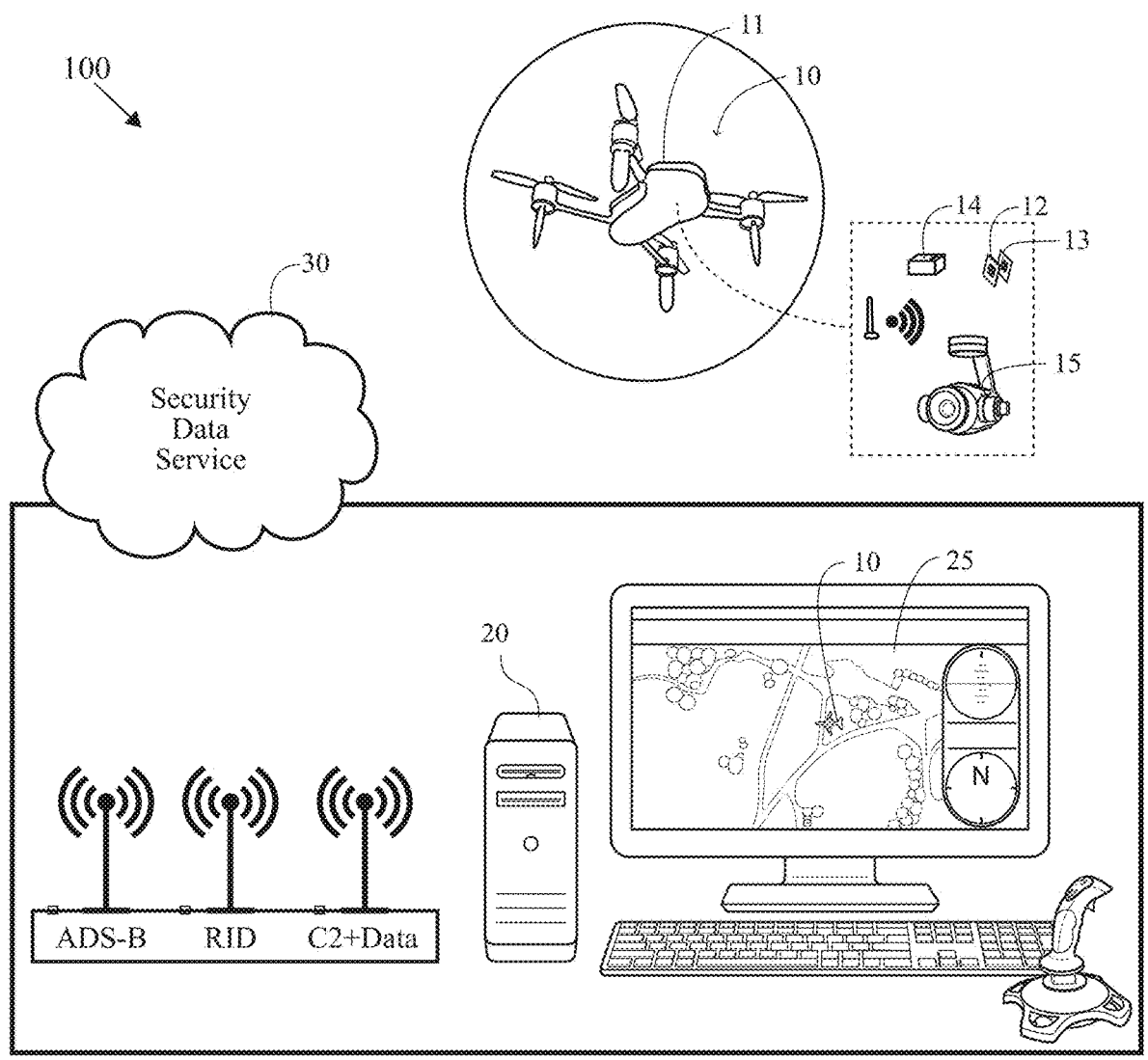
FIG. 18 is an illustration of a system for detecting foreign object debris.

A system 100, as shown in FIG. 18, is configured to detect Foreign Object Debris (FOD) on a movement area surface and to notify the operator of the detection along with location and object details, such as composition and imagery. The system 100 is comprised of an unmanned aerial vehicle (UAV) 10 consisting of an airframe 11, location 12 and altitude 13 sensors, and avionics; the UAV hosting an intelligent payload 14 consisting of an edge processor capable of executing a machine learning model, one or more gimballed camera sensors 15, a data connection to the UAV avionics, a data connection to the ground based data center, a data center consisting of cloud services 30, an end user Inspection Application 25, and a server 20. Whereby the UAV 10 is directed to fly a specific flight path over the movement area surface at specific speed and altitude, the intelligent payload 14 executing a computer vision application which positions the camera sensors 15 at specific angles and collects image frames at specific locations, then the computer vision application compares baseline images with collected images to detect anomalies, the anomalies are tagged with metadata including the precise GPS location they were found, the detected anomalies are then passed through a convolutional neural network, where the anomalies are evaluated for significance and then classified with a confidence level. Anomalies with a predefined confidence level that meets a lower threshold are then transmitted over the data connection to the cloud services in the ground based data center, where the cloud services store the anomaly information and then send a notification containing the anomaly information to connected systems including the inspection application. The inspection application alerts the operator of the FOD detected and dispatches a resolution. The security, FOD, and lighting are inspection applications. The VGSI and ALS are also inspection applications. The computer vision app is part of the platform and runs on the edge processor of the UAV.

Figure 18A:
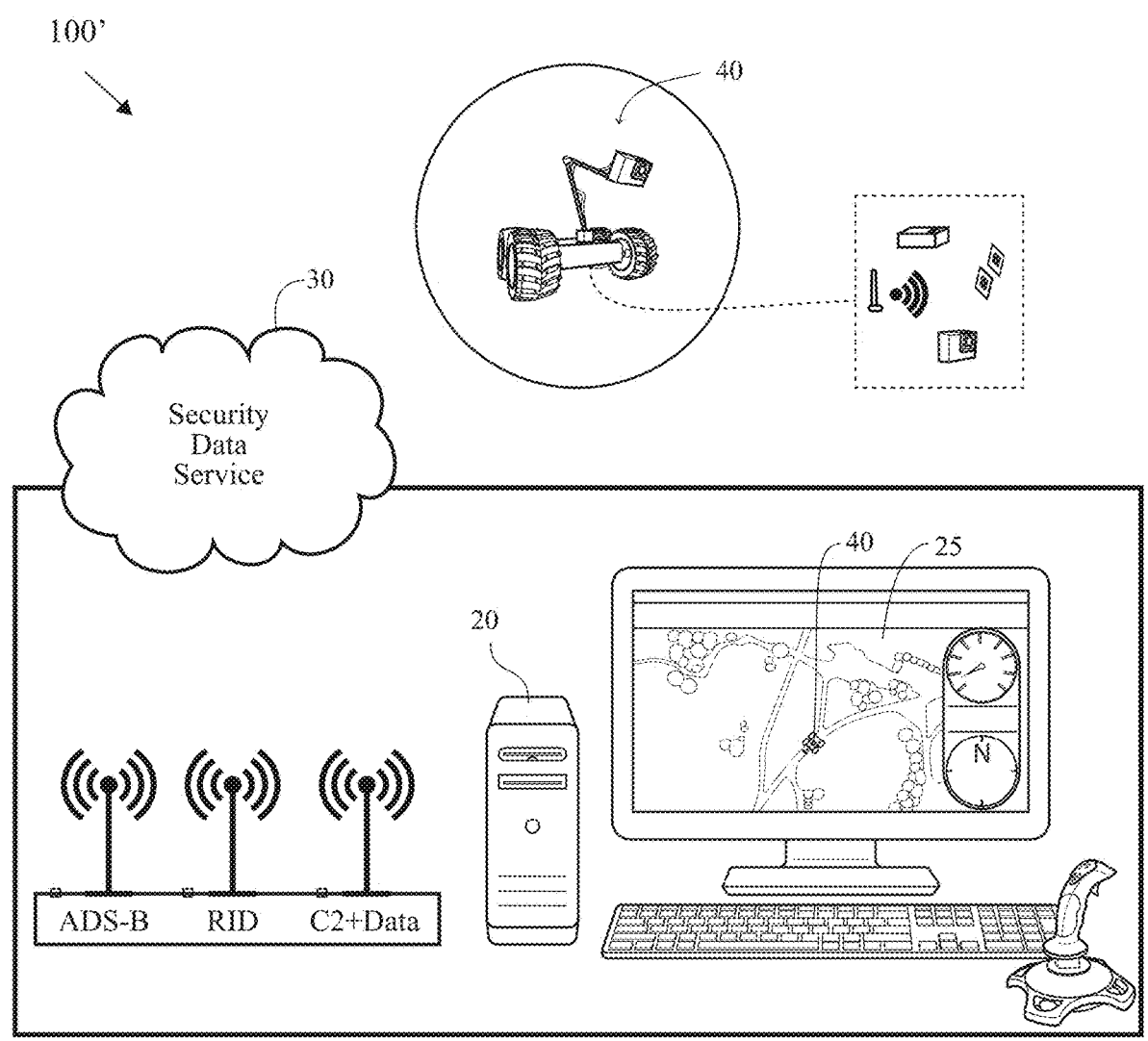
FIG. 18A is an illustration of an alternative embodiment of a system for detecting foreign object debris.
Figure 18B:
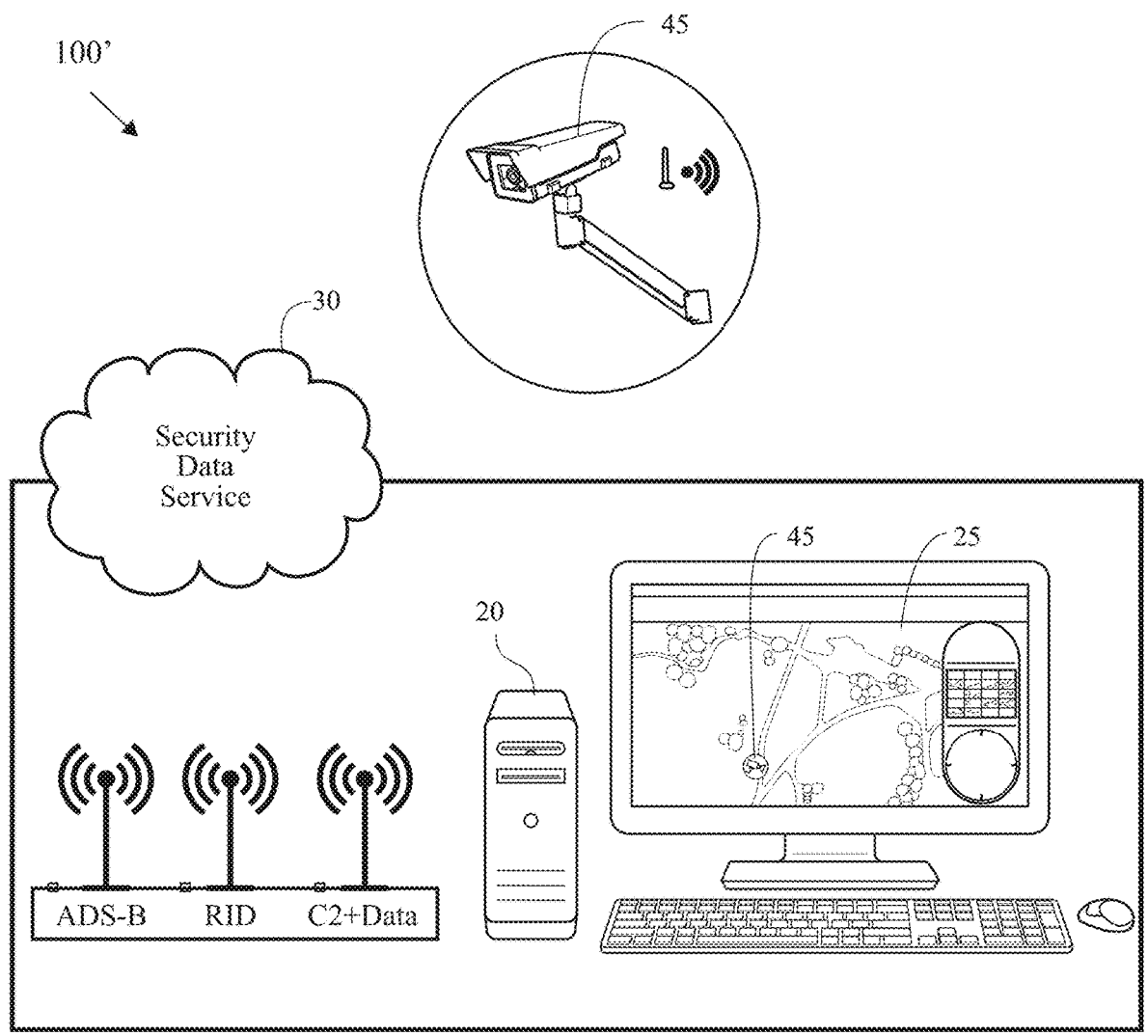
FIG. 18B is an illustration of an alternative embodiment of a system for detecting foreign object debris.

In alternative embodiments, as shown in FIGS. 18A and 18B, a terrestrial robot 40 or a fixed position articulating camera 45 system may be used in place of, or in addition to, the UAV 10.

It will be apparent to one skilled in the art that the UAV may be integrated with the one or more cameras, the one or more sensors, the one or more software modules, lidar, structured light emitters, and the LEDs. Various components in the system environment may be interconnected over the network. It should be noted that the UAV may include some other modules and components as well, without departing from the scope of the disclosure.

Figure 17:
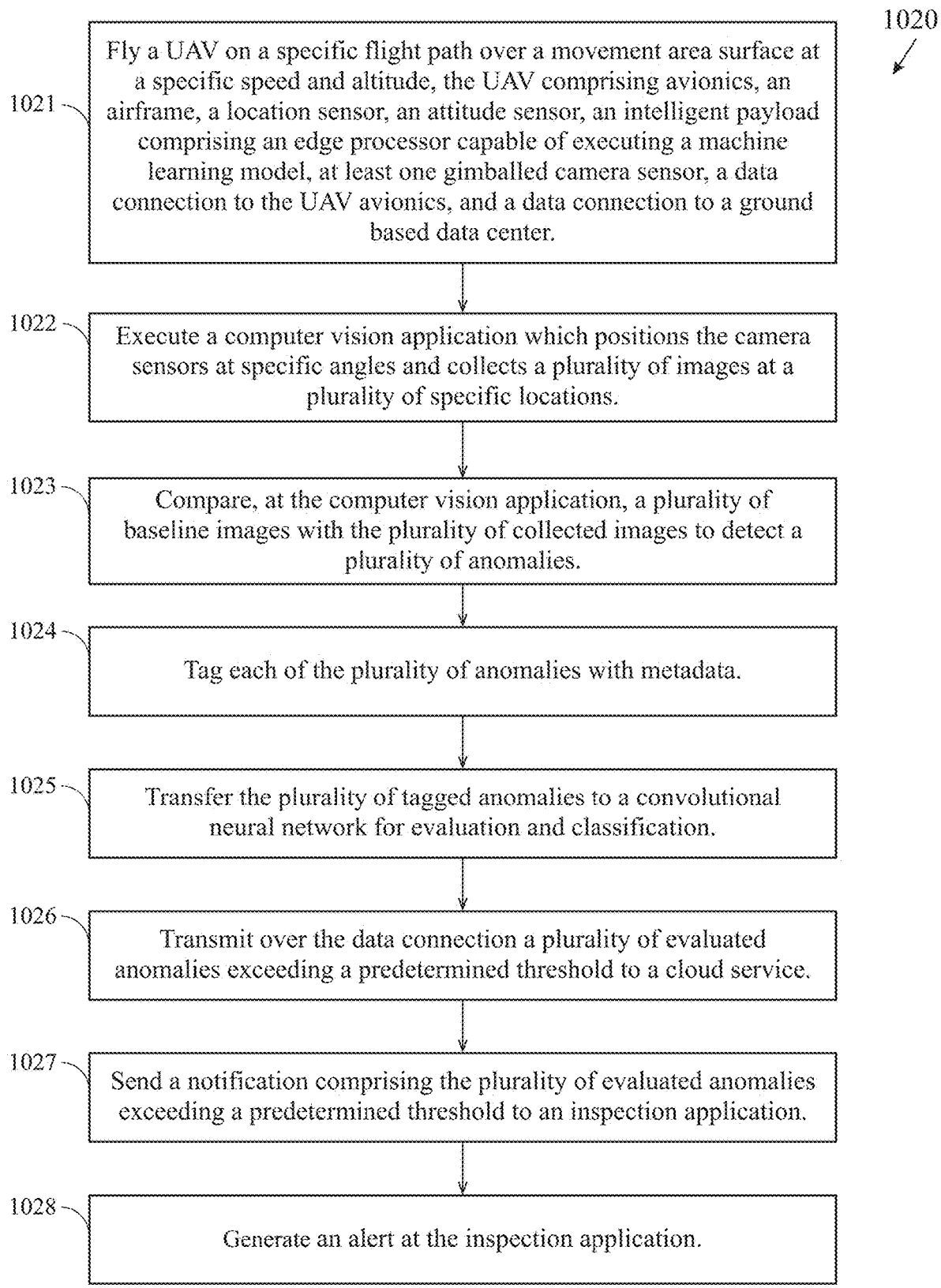
FIG. 17 is a flow chart of a method for detecting foreign object debris.

FIG. 17 is a flow chart for a method 1020 for detecting FOD. In step 1021, a UAV is flown on a specific flight path over a movement area surface at a specific speed and altitude, the UAV comprising avionics, an airframe, a location sensor, an attitude sensor, an intelligent payload with an edge processor capable of executing a machine learning model, at least one gimballed camera sensor, a data connection to the UAV avionics, and a data connection to a ground based data center. In step 1022, a computer vision application is executed, positioning the camera sensors at specific angles and collecting several images at several specific locations. Step 1023 includes comparing baseline images with the collected images to detect anomalies. Step 1024 includes tagging each of the anomalies with metadata, and then transferring the tagged anomalies to a convolutional neural network for evaluation and classification at step 1025. At step 1026, the evaluated anomalies exceeding a predetermined threshold is transmitted to a cloud service over the data connection. In step 1027, send a notification to an inspection application, including the evaluated anomalies exceeding the threshold. Then, generate an alert at the inspection application in step 1028.

The UAV includes a microprocessor, an input device, a memory, a machine learning unit, a tensor processing unit (TPU), a transceiver, a comparator, and an image capturing device. The microprocessor is coupled to the input device, the memory, the machine learning unit, the TPU, the transceiver, the comparator, and the image capture device. The transceiver may connect to the network through the input terminal and the output terminal.

The microprocessor includes suitable logic, circuitry, and/or interfaces that are operable to execute one or more instructions stored in the memory to perform predetermined operations such as painting and cleaning. The microprocessor may be implemented using one or more microprocessor technologies known in the art. Examples of the microprocessor include, but are not limited to, an x86 microprocessor, an ARM microprocessor, a reduced instruction set computer (RISC) microprocessor, a complex instruction set computer (CISC) microprocessor, an application-specific integrated circuit (ASIC), or any other microprocessor.

The input device may comprise suitable logic, circuitry, interfaces, and/or code that may be operable to receive an input from the user. The input may correspond to one or more commands of the user.

The memory stores a set of instructions and data. Some of the commonly known memory implementations include, but are not limited to, a random access memory (RAM), a read-only memory (ROM), a hard disk drive (HDD), and a secure digital (SD) card. Further, the memory includes the one or more instructions that are executable by the microprocessor to perform specific operations. It will be apparent to a person with ordinary skill in the art that the one or more instructions stored in the memory enable the hardware of the system to perform the predetermined operations.

The machine learning unit may use any number of machine learning or artificial intelligence technologies to achieve its purposes, including, but not limited to, neural networks, convolutional neural networks, supervised learning, unsupervised learning, reinforcement learning, and deep learning. Further, the TPU may be an artificial intelligence (AI) accelerator application-specific integrated circuit (ASIC). The TPU may be used for neural network machine learning.

The transceiver transmits and receives messages and data to or from various components of the system environment (e.g., the user computing device) over the network. In some embodiments, the transceiver is coupled to the input terminal and the output terminal through which the transceiver may receive and transmit data/messages, respectively. Examples of the input terminal and the output terminal include, but are not limited to, an antenna, an Ethernet port, a USB port, or any other port that can be configured to receive and transmit data. The transceiver transmits and receives data/messages in accordance with the various communication protocols-such as TCP/IP, UDP, and 2G, 3G, 4G or 5G communication protocols-through the input terminal and the output terminal.

The image capture device may be implemented using one or more image sensing technologies known in the art, such as, but not limited to, a charge-coupled device (CCD) image sensor and a complementary metal oxide semiconductor (CMOS) image sensor.

In an alternate embodiment, the UAV may include a flight controller/processor, a navigation system, an altimeter, and a vision-tracking device. For example, a drone navigation subsystem may include a radio and amplifiers suitable for drone system communications in radio frequency bands such as ultrahigh frequency (UHF), very high frequency (VHF), and/or Wi-Fi, for real-time communication with the user computing device. In one embodiment, the UAV may include a memory storage device that receives and stores programmed flight path control information including instructions to navigate the UAV along a predetermined path, as well as control information and commands.

The network corresponds to a medium through which content and data flow between various components of the system environment (i.e., the UAV, the user computing device). Examples of the network may include, but are not limited to, a Wi-Fi network, a Bluetooth mesh network, a wide area network (WAN), a local area network (LAN), or a metropolitan area network (MAN). Various devices in the system environment may connect to the network in accordance with various wired and wireless communication protocols, such as Transmission Control Protocol over Internet Protocol (TCP/IP), User Datagram Protocol (UDP), and 2G, 3G, 4G or 5G communication protocols. In some embodiments, the network may be a cloud network or cloud-based network.

Figure 1:
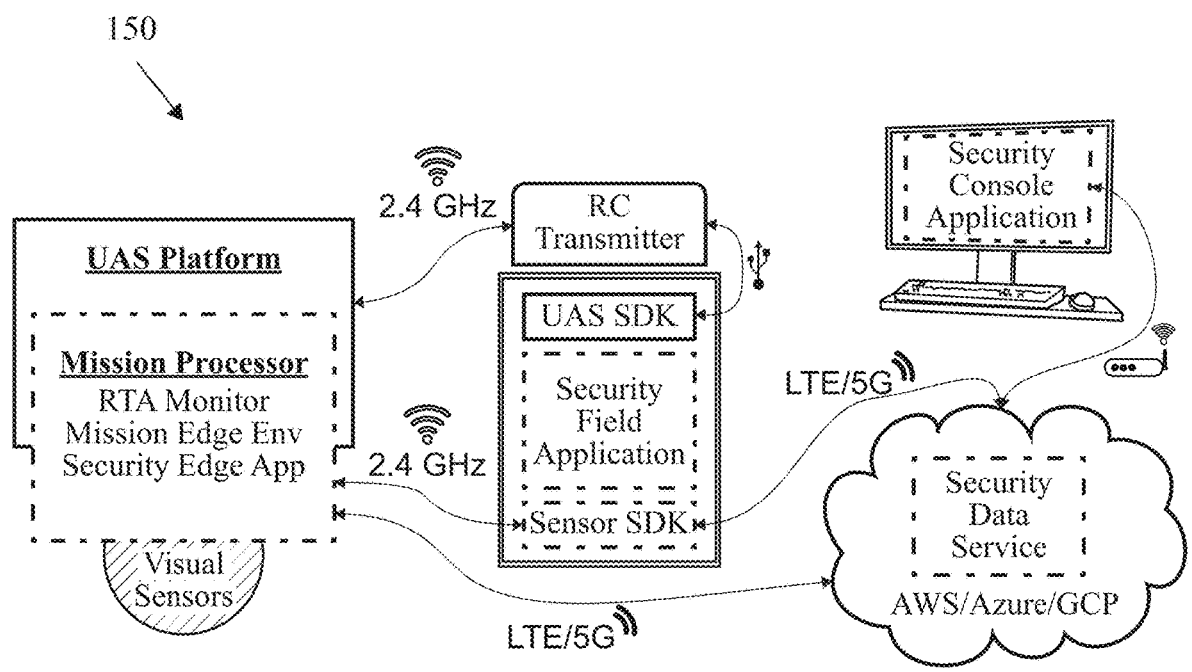
FIG. 1 is a block diagram of a logical security service architecture.

FIG. 1 shows a security service architecture 150.

Figure 2:
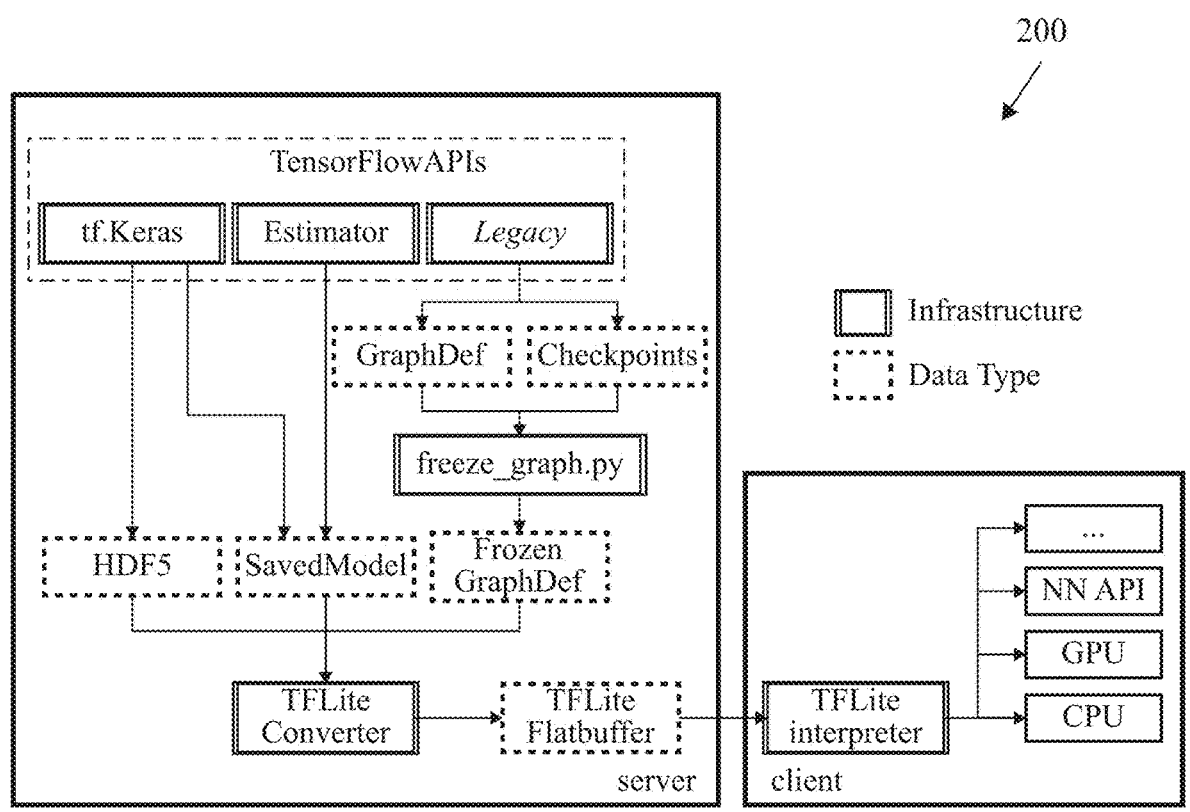
FIG. 2 is a block diagram of a tensor flow lite deployment at the edge.

FIG. 2 shows a tensor flow lite deployment 200 of the edge.

Figure 3:
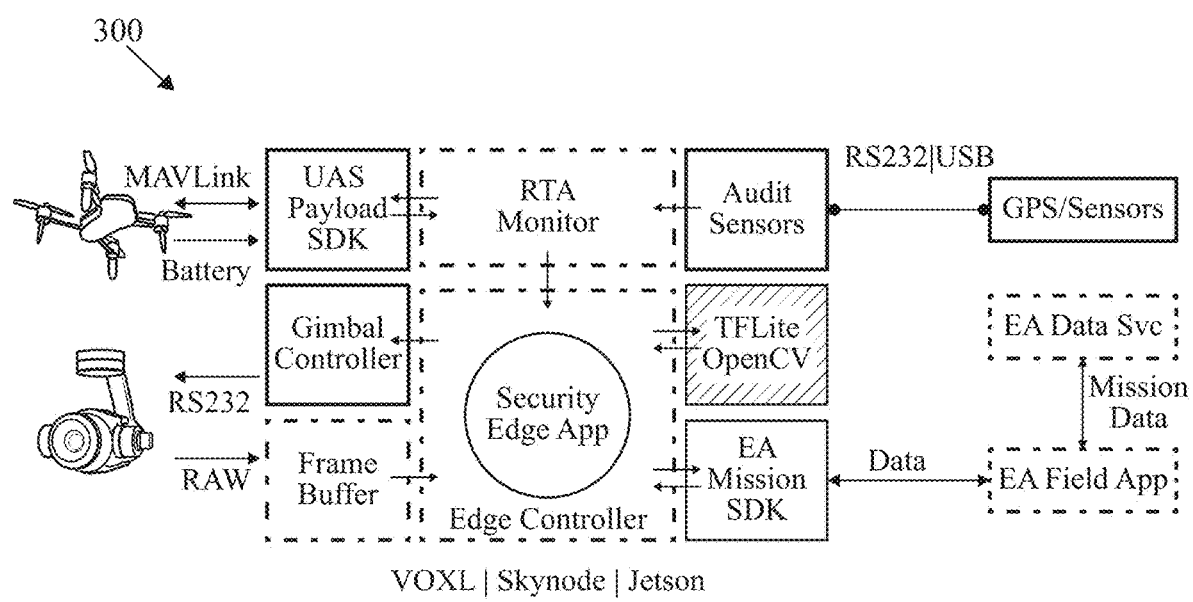
FIG. 3 is a block diagram of a mission edge app RT.

FIG. 3 shows a mission edge app RT 300.

Figure 4:
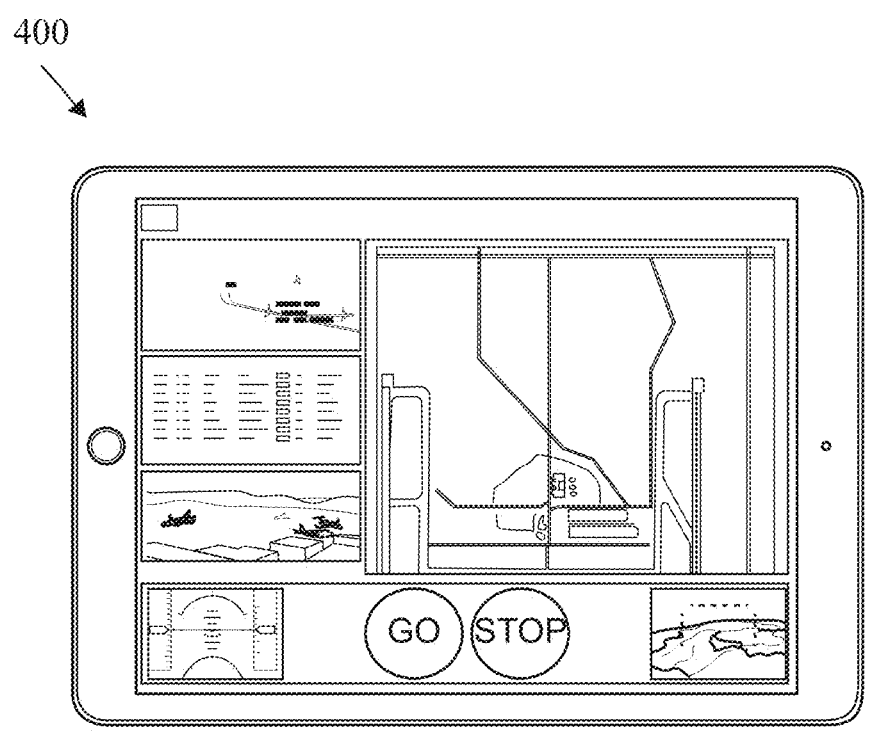
FIG. 4 is an illustration of UI concepts.

FIG. 4 shows a page of the UI on a mobile device 400.

Figure 5:
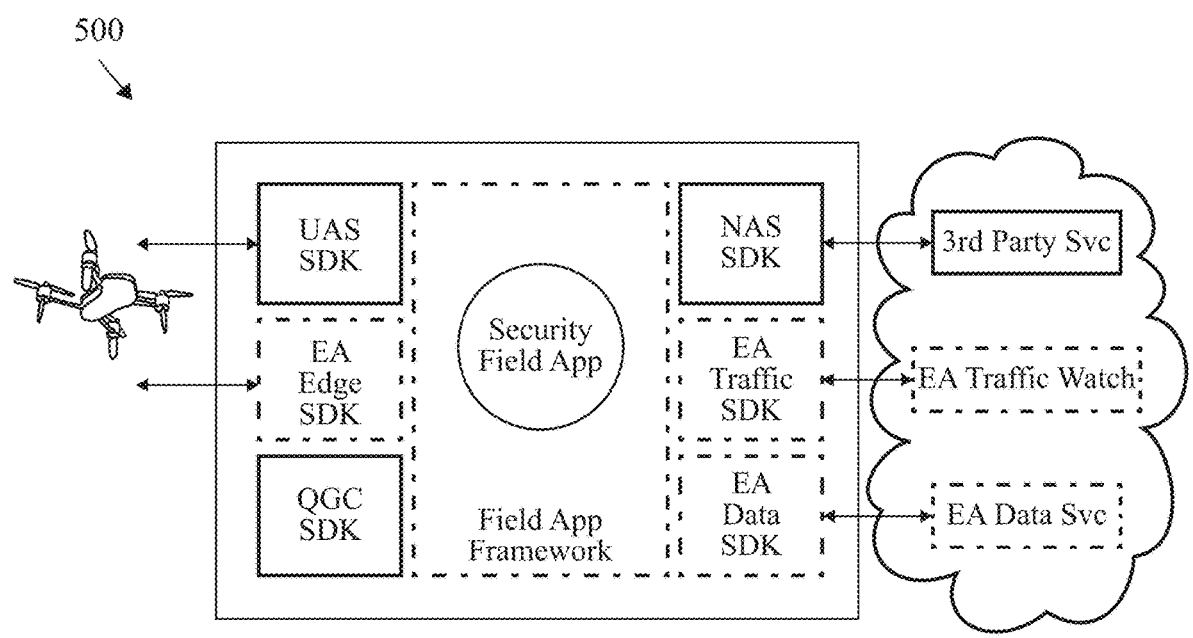
FIG. 5 is a block diagram of security field app internals.

FIG. 5 shows a security field application 500.

Figure 6:
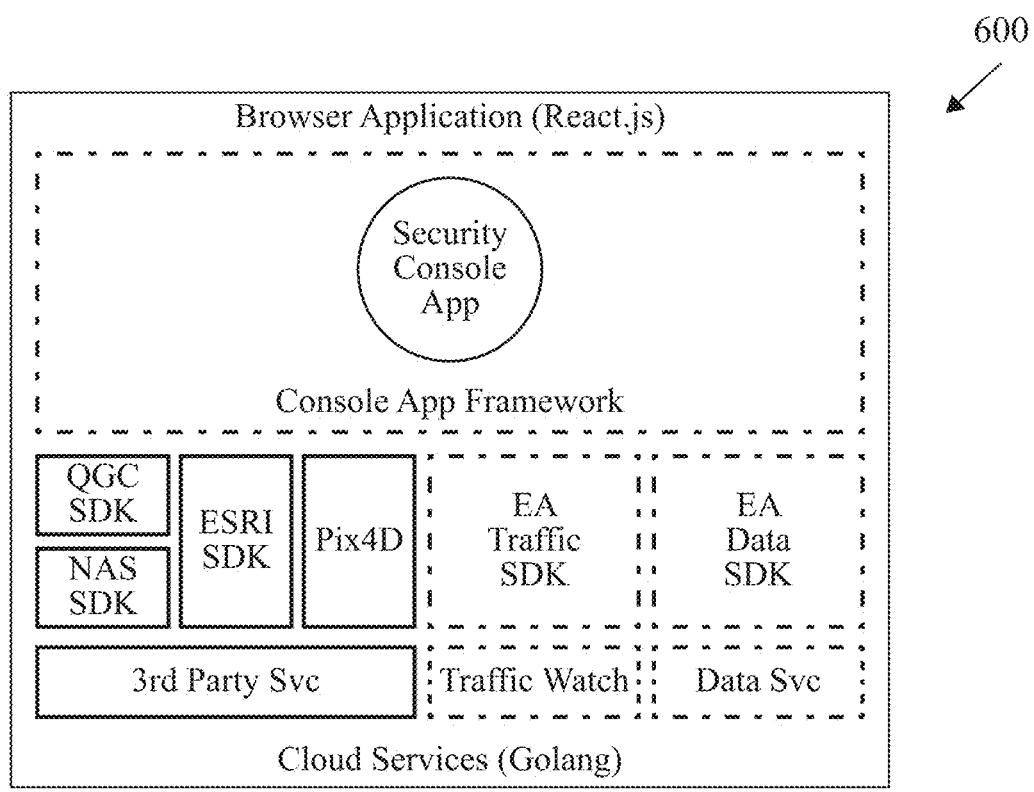
FIG. 6 is a block diagram of security console app internals.

FIG. 6 shows a security console app 600.

Figure 7:
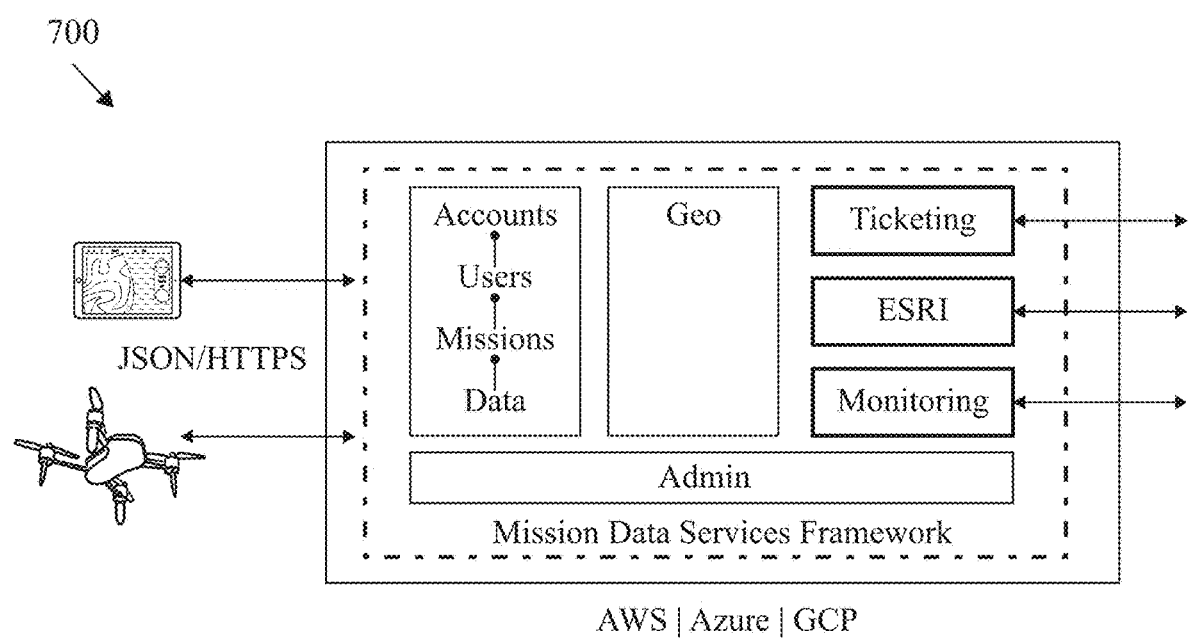
FIG. 7 is a block diagram of mission data services.

FIG. 7 shows a mission data services framework 700.

Customer Onboarding: Create Customer Account-Admin, Profile,

Licenses/Features; Create Users-Invitations, Permissions, Credentials; Configure UAS vehicles-Confirm/Upgrade software levels, ID vehicles to System, ID system to Vehicles (key exchange), Test radio ranging, Configure RTK; Configure Geography-Create Operational Zones: Inclusions, Exclusions, Rally Points, Identify GCPs, Test radio ranging, Identify Points of Interest (POI), Generate Standard Flight Plan.

Figure 10:
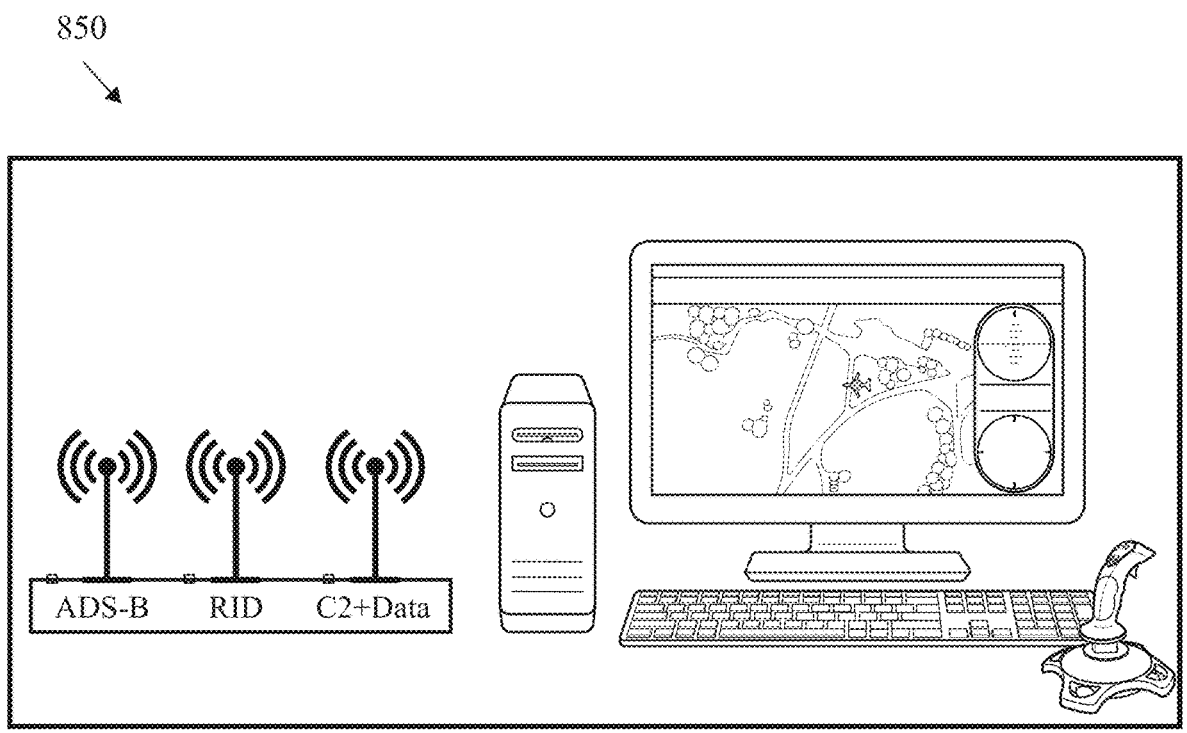
FIG. 10 is an illustration of an Ops center.

Site Survey: Fence Survey-Outline property boundaries in EA,

Number/Label each fence panel and fence post for reference, Capture latitude, longitude, and altitude at bottom and top of each fence post (i) ideally from ESRI data already captured by Airport Authority; (ii) using GPS-Augmentation+3D reconstruction; (iii) using EA designed sensors and measurement system; GPS Survey-Carry aircraft along all routes to gather GPS satellite and signal data; Radio Survey-Carry aircraft along all routes to gather C2 signal data; RID Survey-place RID receiver in tower, ops center, etc. to measure reception. The Ops Center 850 is shown in FIG. 10 with receivers: ADS-B for manned traffic locations; RID for unmanned traffic locations; C2 for command and control; and Data for video, images, and telemetry.

Configure Geography: Configure Operational Zones-Inclusions, Exclusions, Rally Points; Identify GCPs-GCP stationed every 1000'; Identify Points of Interest (POI)-Landmarks, Obstacles, Control Tower, Internal protected areas; Generate Standard Flight Plan-Autogenerate Flight Plan, Autogenerate Geofences, Autogenerate Camera target and focal length.

Figure 8:
FIG. 8 is an illustration of airport deployment.
Figure 8A:
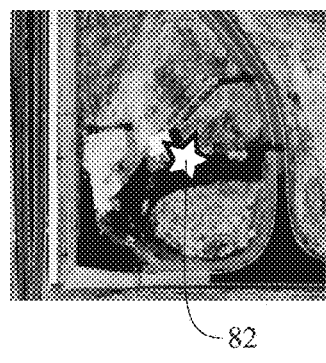
FIG. 8A is a detailed illustration of a Drone Base A.
Figure 8B:
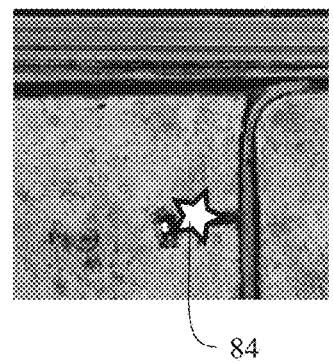
FIG. 8B is a detailed illustration of a Drone Base B.
Figure 9:
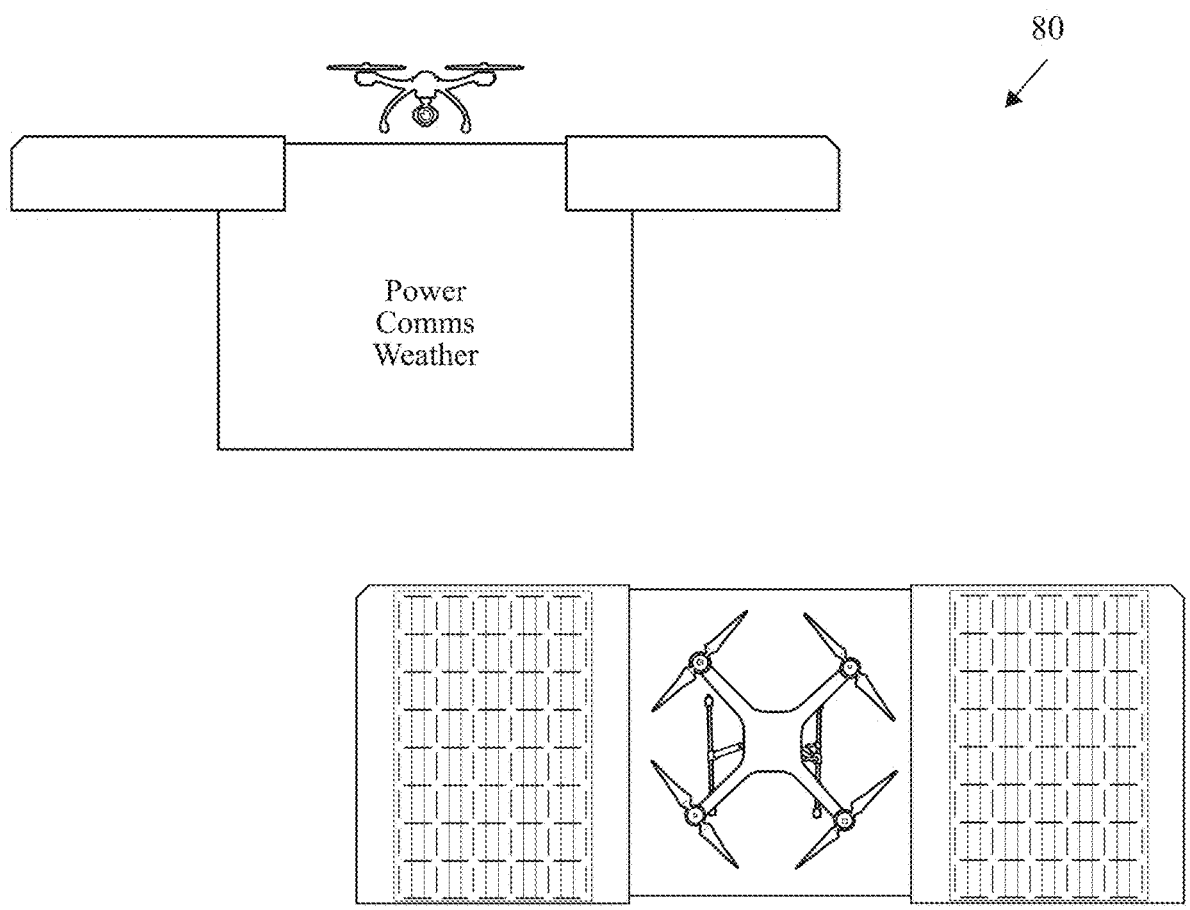
FIG. 9 is an illustration of a drone base.

FIG. 8 shows an example of an airport deployment 800. FIGS. 8A and 8B show Drone Bases A 82 and B 84, respectively. FIG. 9 shows a drone base 80.

Figure 11:
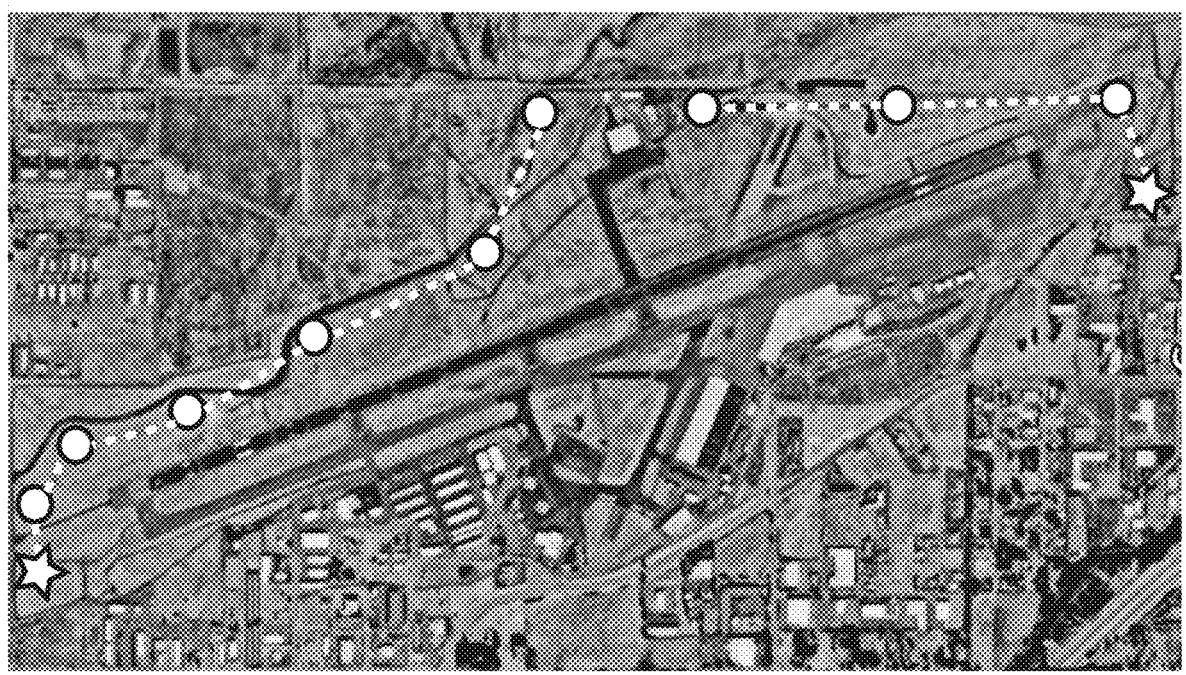
FIG. 11 is an illustration of a crawl fence inspection geography.
Figure 12:
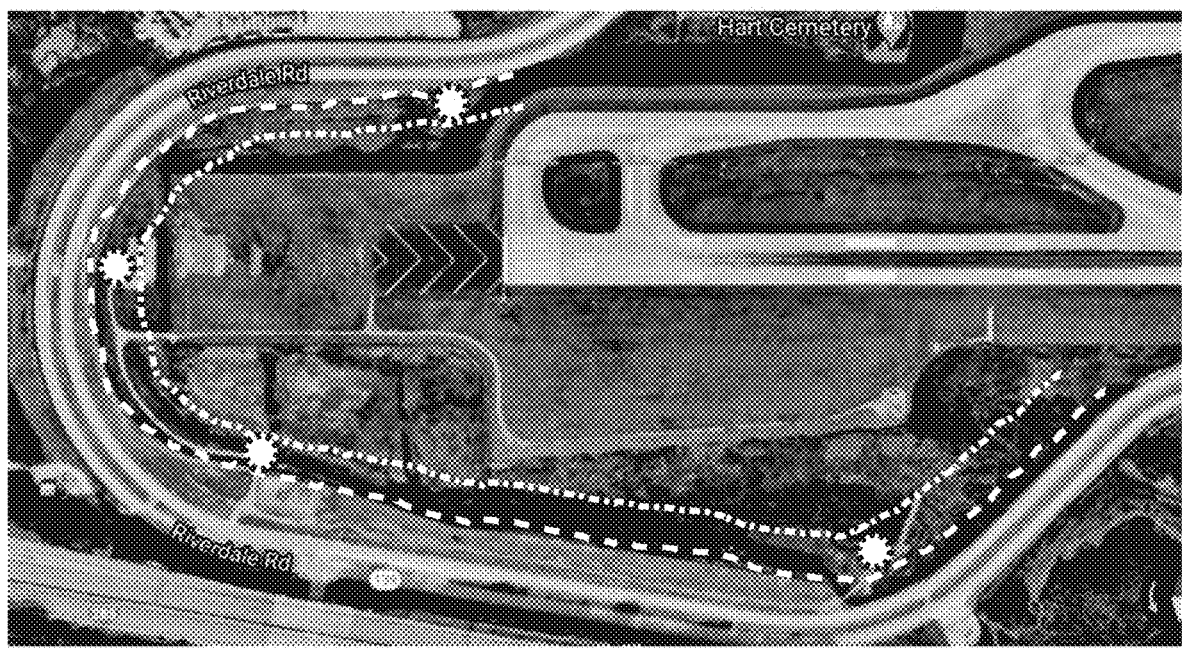
FIG. 12 is an illustration of a crawl fence inspection ROI.
Figure 13:
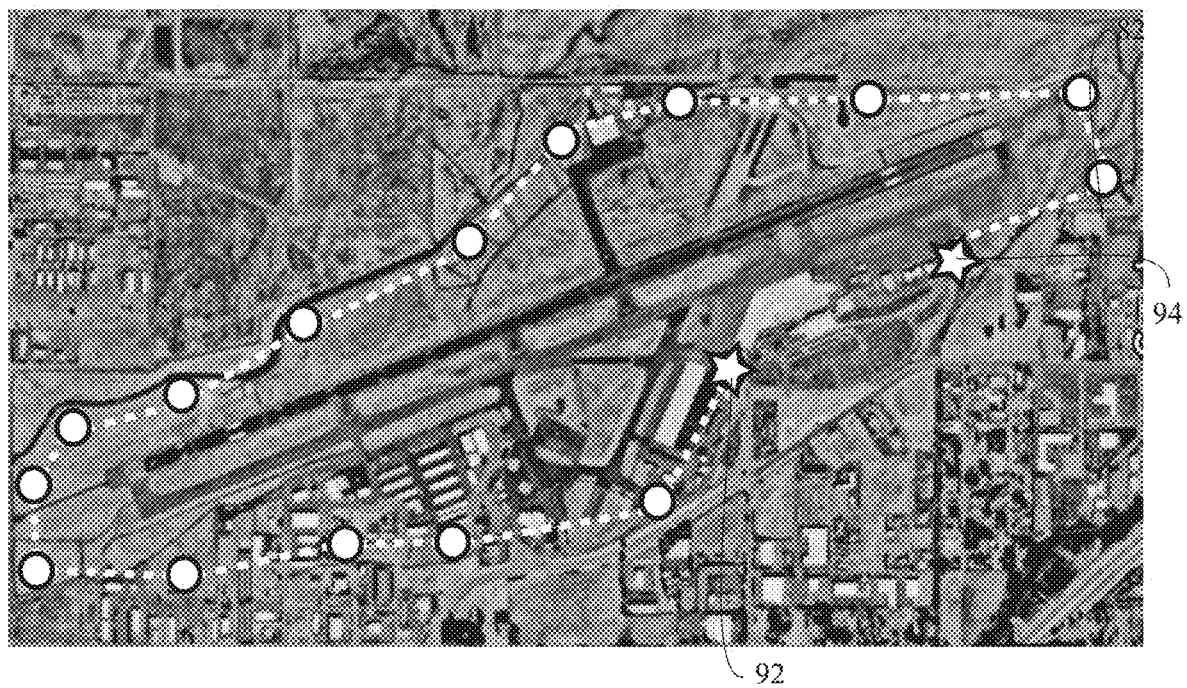
FIG. 13 is an illustration of a walk fence inspection geography.
Figure 13A:
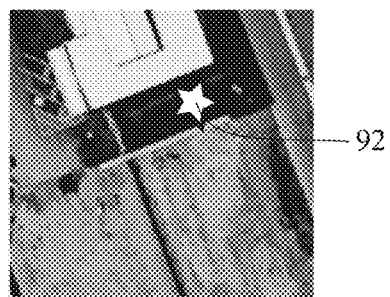
FIG. 13A is a detailed illustration of a launch point A.
Figure 13B:
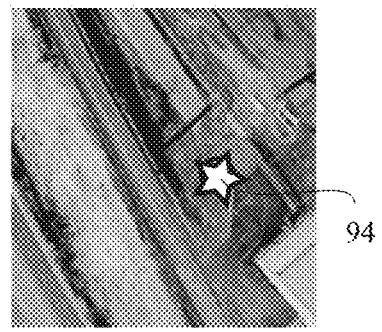
FIG. 13B is a detailed illustration of a launch point B.
Figure 14:
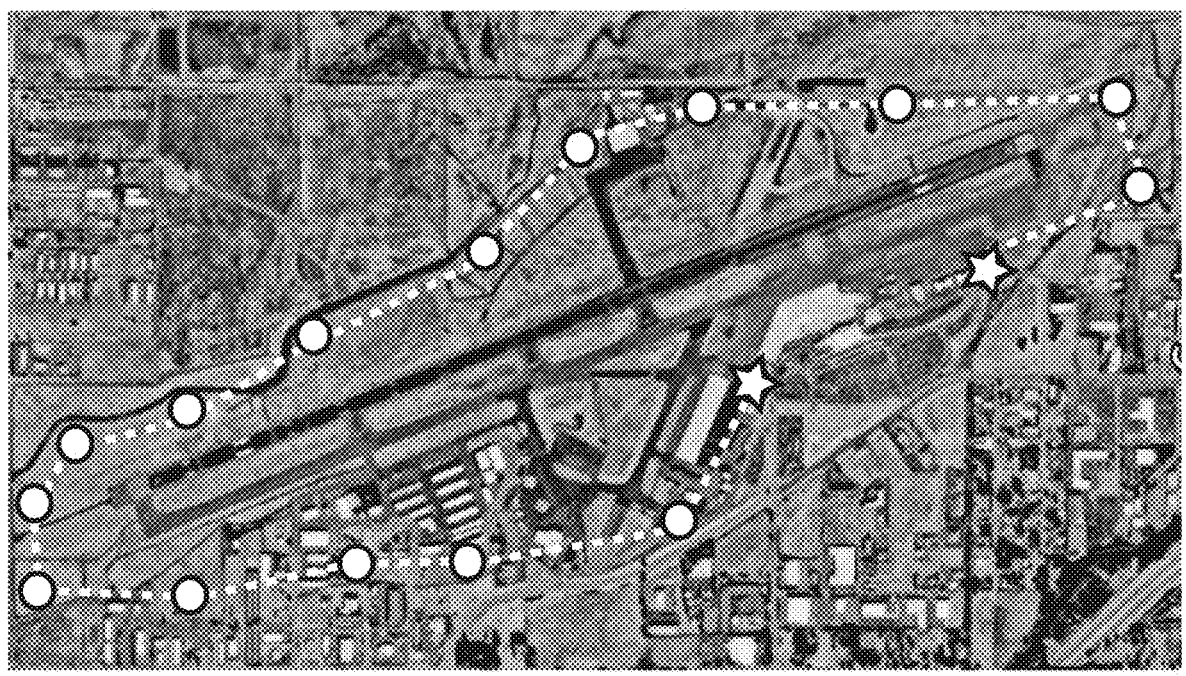
FIG. 14 is an illustration of a run fence inspection geography.
Figure 15:
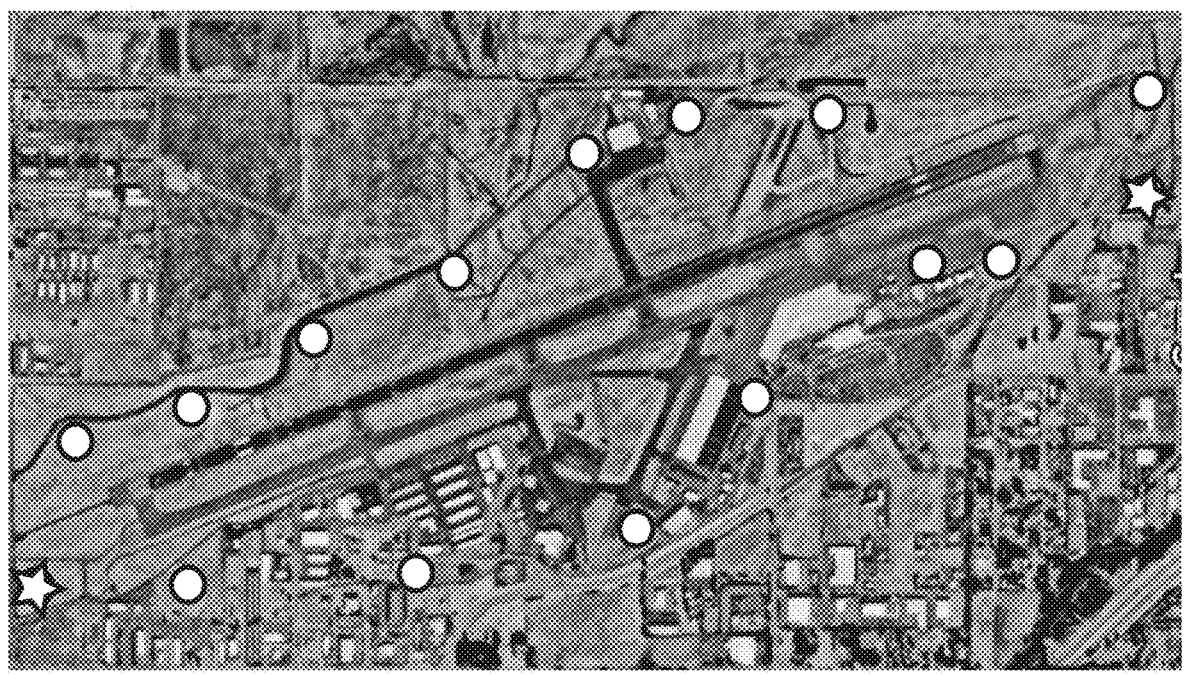
FIG. 15 is an illustration of an operationalized deployment.

FIGS. 11, 13, and 14 show Fence Inspection Geography. FIG. 12 shows a Fence Inspection ROI. FIG. 15 shows and operationalized deployment. Launch point A 92 is shown in FIG. 13A, and Launch point B 94 is shown in FIG. 13B.

Acceptance Test Simulation: Arm Vehicle-Pre-flight Checklist, Self-test, radio check, telem check, data svc check; Configure Security Field App-Pre-takeoff Checklist, Simulation Mode; Start Mission-Pre-mission Checklist, UAS flies to $1^{st}$ Rally Point and waits for activation, RPIC activates the mission on Field App; Image Capture-UAS flies Standard Flight Plan, Camera sensor gimbals camera to proper attitude, Camera captures image, Image placed into frame buffer for processing; Image Coding-Image is geocoded, Object detection isolates fence image, Object classification applies initial classification; Delta Filter-Image is compared with baseline image-no baseline image loaded; Store new Baseline Image-Transmit image to Field App and Data Service; Failure and Hazard Injection-Introduce known hazards, test RPIC and Mitigations; Complete Mission-Continue until Standard Flight Plan is complete, UAS waits at last Rally Point, RPIC deactivates mission on Field App, UAS Returns to Land, Post-flight Checklist.

Acceptance Test Flight: Arm Vehicle-Pre-flight Checklist, Self-test, radio check, telem check, data svc check; Configure Security Field App-Pre-takeoff Checklist, Test Flight Mode; Start Mission-Pre-mission Checklist, UAS flies to $1^{st}$ Rally Point and waits for activation, RPIC activates the mission on Field App; Simulate Image Capture-UAS flies Standard Flight Plan, Camera sensor gimbals camera to proper attitude; Complete Mission-Continue until Standard Flight Plan is complete, UAS waits at last Rally Point, RPIC deactivates mission on Field App, UAS Returns to Land, Post-flight Checklist.

Baseline Capture Daytime: Arm Vehicle-Pre-flight Checklist, Self-test, radio check, telem check, data svc check; Configure Security Field App-Pre-takeoff Checklist, Baseline Mode; Start Mission-Pre-mission Checklist, UAS flies to $1^{st}$ Rally Point and waits for activation, RPIC activates the mission on Field App; Image Capture-UAS flies Standard Flight Plan, Camera sensor gimbals camera to proper attitude, Camera captures image, Image placed into frame buffer for processing; Image Coding-Image is geocoded, Object detection isolates fence image, Object classification applies initial classification; Delta Filter-Image is compared with baseline image-no baseline image loaded; Store new Baseline Image-Transmit image to Field App and Data Service; Complete Mission-Continue until Standard Flight Plan is complete, UAS waits at last Rally Point, RPIC deactivates mission on Field App, UAS Returns to Land, Post-flight Checklist.

Figure 16:
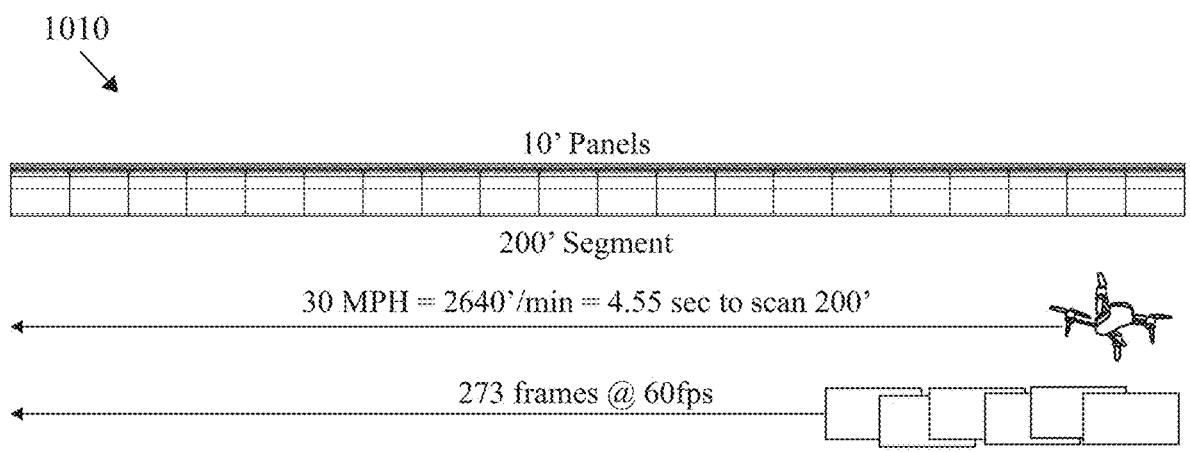
FIG. 16 is an illustration of an image capture.

FIG. 16 shows Image Capture 1010. 8 inches of new data/frame, frame=20 feet, 96% of all data is redundant.

Baseline Review and validation: Log into Essential Console Application-User is given toolbar with Mission Applications they can use, User navigates to Security Application; Navigate to Manual Inspection-Filter on Baselines, Select Baseline Mission to inspect (time machine); Play Mission Mode or use mouse to move forward/backward in the mission-Flag Baseline Images that are not acceptable, add annotations as needed, Confirm flags/annotations and exit Visual Inspection.

Inspection: Arm Vehicle-Pre-flight Checklist, Self-test, radio check, telem check, data svc check; Configure Security Field App-Pre-takeoff Checklist, Enter Inspection Mode, Select Baseline if other than Most Current; Start Mission-UAS flies to $1^{st}$ Rally Point and waits for activation, RPIC activates the mission on Field App; Image Capture-UAS flies Standard Flight Plan, Camera sensor gimbals camera to proper attitude, Camera captures image, Image placed into frame buffer for processing; Image Coding-Image is geocoded, Object detection isolates fence image, Object classification applies initial classification; Delta Filter-Image is compared with baseline image, Alert Field App on material delta->message+geo coding; Archive Image-Transmit image to Data Service with metadata; Complete Mission-Continue until Standard Flight Plan is complete, UAS waits at last Rally Point, RPIC deactivates mission on Field App, UAS Returns to Land, Post-flight Checklist.

Inspection Review and Certification: Login into Console-User is given toolbar with Mission Applications they can use, User navigates to Security Application, User navigates to Flight Logs; Review Inspection Report-View list of inspections, view individual inspection as desired, Review reports, Certify reports.

Process Steps Off Nominal Events: RPIC Interrupt-User is given toolbar with Mission Applications they can use, User navigates to Security Application; Traffic Detected-Identify closest Rally Point away from hazard, Navigate on pre-programmed path to Rally Point and Pause; RTA Monitor Alert-Identify closest Rally Point, Navigate on preprogrammed path to Rally Point and Land; RTA Monitor Abort-Terminate mechanical, Deploy emergency mitigations Use of Field App: Inspection-Pre-flight Checklist, Arm Vehicle, Pre-takeoff Checklist, Activate Mission, Monitor Inspection, Pause Inspection, Resume Inspection, Abort Inspection, Deactivate Mission, Post-flight Checklist; Simulation-Set system in Simulation Mode, Perform Inspection.

Edge Application Elements: Virtualization; Container Management; Camera interface drivers (camera stream, gimbal control); Field App Connectivity; Data Service Connectivity; CNN Engine (TFLite Interpreter); CNN Model Manager; GNSS/RTK interface; Baseline image store and synchronizer; Image comparison engine (OpenCV).

Security Console App Elements: Browser based App-Login from website, User Login->Email+2 step auth; User Management-CRUD, Invite users; Geography Management-Maps, flight plans, geofences, rally points, ESRI connections; ML Management-Learning, Classification, Models; Awareness-Should have; Manage Checklists-Create/Update Preflight: vehicle, awareness, mission, Create/Update Postflight: review off-nominal events, close inspection; Monitoring-Visualize UAS in motion, FPV, Camera view; Inspection Certification-Review and certify past inspections, View imagery in time machine, by anomaly, by flight path, by image.

Security Data Service: Customer-Internal CRUD, Profile: Typical data, ticketing; User-Invitation subscription, Security credentials: Email, SSO ESRI, Access Permissions; Mission-Security only at MVP->Collection of Security Inspections; Security Inspection-Collection of Images->images in S3 type storage, Metadata: RPIC, Operator, Status/State, Pre-brief, Post-Brief, Checklists, Pix4D photo mosaic engine.

Safety Hazard and Mitigations: Loss of Containment; Loss of Command and Control (C2); Loss of GPS; Low Battery; Impact with Humans in the Air (DAA); Impact with Humans on Ground (OOP); Wake Turbulence; Identification of Approved Operations (RID); Adverse Weather Conditions Loss of Containment: Definition-UAV strays outside of its approved operational area; Mitigations-Automated flight with a pre-programmed flight plan, Geofencing providing warning and violation alerting, Runtime assurance (RTA) monitor on co-processor, Redundant location and movement sensors, Parachute deployed for catastrophic abort.

Loss of Command And Control: Definition-UAV experiences a loss of functional C2 radio communications; Mitigations-UAV and Controller loss of comms monitoring, UAV maintains containment boundaries, UAV executes LOSS OF C2 procedure, Hover in place for small period of time (30 sec), Transition to closest Rally Point, Loiter at Rally Point until Low Battery, Land at Rally Point.

Loss of GPS: Definition-UAV experiences a loss of GPS positioning making it unable to navigate safely; Mitigations-UAV monitors 7-14 GPS satellites concurrently, UAV enters degraded GPS with less than 5 visible, UAV executes LOSS OF GPS procedure, UAV enters hover, points camera at ground, FMU uses Computer Vision to hold to ground position, Loiter at current position until Low Battery, Land directly below UAV.

Low Battery: Definition-UAV experiences a depletion of battery power that exceeds its ability to continue a mission; Mitigations-UAV monitors battery rate of consumption and level, UAV warns pilot on low battery condition, UAV aborts mission on critical battery condition and lands in closest Rally Point.

Impact With Humans in the Air: Definition-UAV experiences a collision or near miss with manned air traffic; Mitigations-Pilot controller shows ADS-B reporting aircraft, Pilot controller shows RID reporting UAVs, Pilot is monitoring CTAF, Ground, and Tower frequency for traffic, Pilot is in communication with the Tower at tower controlled facilities.

Impact with persons on the ground: Definition-UAV experiences a loss of control and impacts persons on the ground; Mitigations-UAV is operating in a closed and secure airport environment, UAV is operating in a narrow geofenced corridor designed to avoid all exposed persons, UAV has a parachute that is deployed automatically upon catastrophic loss of flight control.

Wake Turbulence: Definition-UAV enters wake from larger aircraft and is pushed out of containment corridor; Mitigations-Wake turbulence model with separation requirements per aircraft class, UAV loiters at Rally Point as necessary to provide separation from possible wake, Accidental encounter with heavy winds causes UAV to redirect to closest Rally Point in direction of travel.

Identification of Approved Operations: Definition-Approved UAV operations cannot be distinguished from unapproved operations; Mitigations-UAV implements ASTM Remote ID Standard, ASTM Remote ID Standard satisfies FAA RID NPRM, Airport operations staff has access to RID monitor.

Adverse Weather Conditions: Definition-Weather conditions exceed limitations of the vehicle; Mitigations-Automated monitor of the airport WX station, UAV does not arm if WX exceeds limitations.

Image Capture Steps: Pull in frame buffer; Options-Calculate new portion +x % based upon speed, discard the rest, Find last image in new image, discard duplicate portion; Perform micro analysis on new portion; Stitch new portion to mosaic; Perform macro analysis on mosaic.

The disclosed methods and systems, as illustrated in the foregoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system may comprise a computer, an input device, a display unit, and the internet. The computer may further comprise a microprocessor. The microprocessor may be connected to a communication bus. The computer may also include a memory. The memory may be random-access memory or read-only memory. The computer system may further comprise a storage device, which may be a hard disk drive or a removable storage device such as a floppy disk drive, an optical disk drive, an SD card, flash storage, or the like. The storage device may also be a means for loading computer programs or other instructions into the computer system. The computer system may also include a communication unit. The communication unit may allow the computer to connect to other computer systems and the Internet through an input/output (I/O) interface, allowing the transfer and reception of data to and from other systems. The communication unit may include a modem, an Ethernet card, or similar devices that enable the computer system to connect to networks such as LANs, MANs, WANs, and the Internet. The computer system facilitates input from a user through input devices accessible to the system through the I/O interface.

To process input data, the computer system may execute a set of instructions stored in one or more storage elements. The storage element(s) may also hold other data or information, as desired. Each storage element may be in the form of an information source or a physical memory element present in or connected to the processing machine.

The programmable or computer-readable instructions may include various commands that instruct the processing machine to perform specific tasks, such as steps that constitute the method of the disclosure. The systems and methods described can also be implemented using software alone, hardware alone, or a varying combination of the two. The disclosure is independent of the programming language and the operating system used by the computers. The instructions for the disclosure may be written in any programming language, including, but not limited to, assembly language or machine instructions, C, C++, Objective-C, Java, Swift, Python, and JavaScript. Further, software may be in the form of a collection of separate programs, a program module containing a larger program, or a portion of a program module, as discussed in the foregoing description. The software may also include modular programming in the form of object-oriented programming. The processing of input data by the processing machine may be in response to user commands, the results of previous processing, or a request made by another processing machine. The methods and systems of the disclosure may also be implemented using various operating systems and platforms, including, but not limited to, Unix, Linux, BSD, DOS, Windows, Android, iOS, Symbian, a real-time operating system, and a purpose-built operating system. The methods and systems of the disclosure may be implemented using no operating system as well. The programmable instructions may be stored and transmitted on a computer-readable medium. The disclosure may also be embodied in a computer program product comprising a computer-readable medium with any product capable of implementing the above methods and systems or the numerous possible variations thereof.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A method for detecting foreign object debris (FOD), the method comprising:

flying an unmanned aerial vehicle (UAV) on a specific flight path near a movement area surface at a specific speed and altitude, the UAV comprising avionics, an airframe, a location sensor, an attitude sensor, an edge processor capable of executing a machine learning model, at least one gimballed camera sensor, electromagnetic interference (EMI) sensor, a passive intermodulation (PIM) sensor, a high-intensity radiated field (HIRF) sensor, and a data connection to the avionics and a ground-based data center;

executing a computer vision application which positions the at least one gimballed camera sensor at specific angles and collects a plurality of images at a plurality of specific locations;

comparing, at the computer vision application, a plurality of baseline images with the plurality of collected images to detect a plurality of anomalies, wherein the plurality of anomalies comprises FOD;

tagging each of the plurality of anomalies with metadata including a GPS location;

transferring the plurality of tagged anomalies to a convolutional neural network for evaluation and classification;

transmitting over the data connection anomalies exceeding a predetermined threshold of duplicate detections in a same geographic location on overlapping images to a cloud service;

sending a notification comprising the plurality of evaluated anomalies exceeding the predetermined threshold to an inspection application on a mobile device; and generating an alert on the inspection application that FOD has been detected.

2. The method according to claim 1 wherein the UAV further comprises a memory and a comparator.

3. The method according to claim 1 wherein the at least one gimballed camera sensor is a charge-coupled device (CCD) image sensor or a complementary metal oxide semiconductor (CMOS) image sensor.

4. The method according to claim 1 wherein the plurality of images are geocoded.

5. The method according to claim 1 further comprising configuring operational zones and surveying boundaries.

6. A system for detecting foreign object debris (FOD), the system comprising:

an unmanned aerial vehicle (UAV) comprising avionics, an airframe, a location sensor, an attitude sensor, an edge processor capable of executing a machine learning model, at least one gimballed camera sensor, a data connection to the avionics, a computer vision application, electromagnetic interference (EMI) sensor, a passive intermodulation (PIM) sensor, a high-intensity radiated field (HIRF) sensor, and a data connection to a ground-based data center;

an inspection application; and a server;

wherein the UAV is configured to fly on a specific flight path near a movement area surface at a specific speed and altitude;

wherein the computer vision application is configured to execute to position the at least one gimballed camera sensor at specific angles and collect a plurality of images at a plurality of specific locations;

wherein the computer vision application is configured to compare a plurality of baseline images with the plurality of collected images to detect a plurality of anomalies, wherein the plurality of anomalies comprises FOD;

wherein the computer vision application is configured to tag each of the plurality of anomalies with metadata including a GPS location;

wherein the computer vision application is configured to transfer the plurality of tagged anomalies to a convolutional neural network of the server for evaluation and classification;

wherein the data connection is configured to transmit the anomalies exceeding a predetermined threshold of duplicate detections in the same geographic location on overlapping images to a cloud service;

wherein the cloud service is configured to send a notification comprising the anomalies exceeding the predetermined threshold to an inspection application; and wherein the inspection application is configured to generate an alert that FOD has been detected.

* * * * *